July 18, 1939.　　　　　K. RABE　　　　　2,166,769
SPRING MECHANISM FOR RAILWAY VEHICLES
Filed March 12, 1936　　　2 Sheets-Sheet 1

Karl Rabe
Inventor
by A. A. Wicke
Attorney

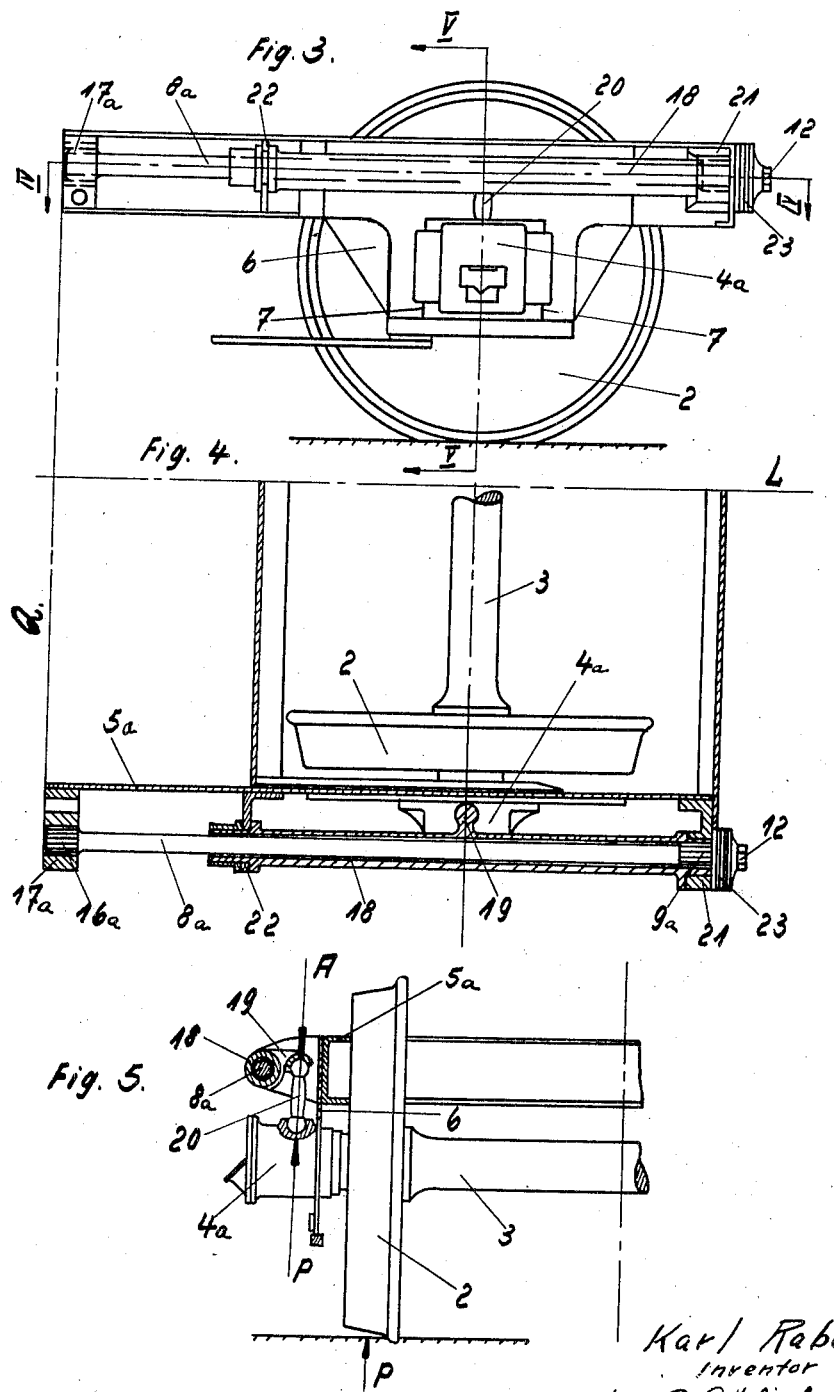

Patented July 18, 1939

2,166,769

UNITED STATES PATENT OFFICE 2,166,769

SPRING MECHANISM FOR RAILWAY VEHICLES

Karl Rabe, Stuttgart, Germany, assignor to Dr. ing. h. c. F. Porsche, K.-G., Stuttgart-Zuffenhausen, Germany, a corporation of Germany Application March 12, 1936, Serial No. 68,436
In Germany March 19, 1935

16 Claims. (Cl. 267—57)

This invention relates to spring mechanism for railway vehicles, and is applicable particularly in constructions where the axles are directly secured to the vehicle frame as well as where the axles are secured to trucks each carrying a plurality of axles in parallel alinement. It is more particularly related to the application of torsional spring means between the vehicle body and the axles of such and other vehicles.

The use of leaf springs in the prior art was found to represent a poor volume utilization (i. e. the amount of material required to give the desired springing effect is very large). Furthermore, the damping action of leaf springs is varied by the entry of dust or moisture or oil between the laminations. Furthermore, coil springs provide no damping action and have other disadvantages. Neither method of springing represents an ideal method and a combination of the two methods had the objection of combining the disadvantages of both.

An object of the present invention is to provide spring mechanism having the advantages of space economy capable of a desired degree of damping.

A further object of the present invention is to provide a springing system with an adjustable degree of damping which is not affected by exterior conditions.

A further object of the present invention is to provide spring means for a railway vehicle or the like that is readily adjustable as to tension and to a desired degree of precision.

A more specific object of the present invention is to attain volume utilization and space economy in spring means that is from two to four times the value for leaf springs.

Further objects and advantages of this invention will be apparent from consideration of the specification as illustrated by the accompanying drawings of possible embodiments of the invention, in which drawings:

Fig. 3 is an elevation of a modification;

Fig. 4 is a sectional plan on line IV—IV of Fig. 3;

Fig. 5 is a partial section on the line V—V of Fig. 3.

Figure 1:
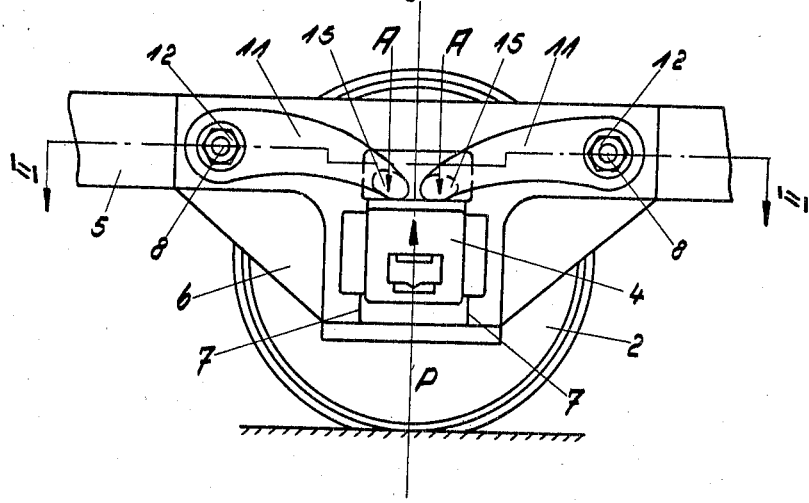
Fig. 1 is an elevation of a form of such spring means applied to a single axle.
Figure 2:
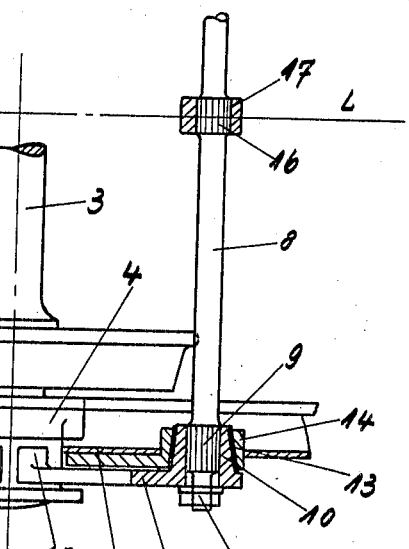
Fig. 2 is a sectional plan on the line II—II of Fig. 1.

In the form shown in the drawings, the flanged railway wheel 2 is rigidly mounted on the axle 3 which, in turn, is journaled in a bearing box or journal 4 mounted to support the truck frame member or vehicle frame member 5. The member 5 may carry the usual plate member 6, slotted to furnish guiding edges 7 for the vertical oscillatory movements of the axle and journal box. Resilient springing of the axle is provided by torsional spring members 8 (solid or tubular) mounted on either side of the axle and having a spline connection at 9 to the hub 10 of a crank arm or lever 11. The crank member 11 is preferably secured upon the torsion member 10 8 by a nut 12 threaded on its extremity.

If a damping action is desired, the exterior of the hub 10 may be formed conically and arranged to fit into a similarly shaped cavity in a portion 14 of the plate 6. A lining of friction material 13 is preferably used to furnish the desired resistance to motion of the crank arm, which can be increased by tightening of the nut 12 or reduced by loosening the nut 12 which also serves to hold the parts together. The outer extremity of the crank arm 11 is finished in a widened or ball-like tip 15 which bears on the top plate of the journal box 4, transmitting part of the vehicle load to the axle. The varying loads are properly transmitted through this arrangement and excessive oscillation is prevented by the friction material 13.

The torsion rods are shown symmetrical about their center where they are each secured to the center of the wheel truck or vehicle body through an element 17, as by a spline connection which provides a rigid but adjustable connection. To permit a fine, precise adjustment a different number of splines may be provided at 16 than at 9. Angular adjustment of the torsion member 8 may be readily accomplished at 16, 17, or at 9, 10, or with greater fineness by differential adjustment at both places. The torson bar 8 can readily be removed from the vehicle at either side by removal of the nut 12 from the opposite side.

It will be seen that the arrangement is symmetrical with respect to a vertical plane through either the center axis of the vehicle or the axis of an axle shaft. The load P on the wheel is the sum of the loads A from the crank arms. Additional loading introduces additional torsion stress in the members 8 until equilibrium is reached.

In the embodiment in Figs. 3 to 5 the torsion bars 8a are arranged parallel to the longitudinal axis of the vehicle. The frame member 5a of the truck or vehicle carries brackets 21 and 22 in which are journaled the ends of the tubular member 18, enclosing the torsion member 8a, one end of which is attached as by splines 9a to the member 18 and the other is fixed as by splines 16a in the bearing bracket 17a attached to the frame 5a. The tubular member 18 may be of relatively rigid construction or, if desired, may be of such cross-section and of such material as to form also a torsion spring and thus increase the spring action and improve the volume utilization. A lever or crank extension 19 from the center of member 18 transmits the vehicle load to journal box 4a as through a strut 20, preferably formed with ball ends seated in sockets in arm 19 and journal box 4a respectively. Between the bar 8a and the bracket 21 is preferably connected a shock absorber comprising a group of friction plates 23 connected alternately to the bar and bracket and adjustably tightened by a nut 12.

The term "frame" as herein used is not intended to be limited to mean the main vehicle body frame but to include in its meaning either the main vehicle frame or merely the wheel truck frame.

The invention is not intended to be limited to the two forms shown, which are to be understood as illustrative only and not as limiting, as various changes in construction and arrangement may be made, all coming within the scope of the claims which follow.

I claim:

1. In a railway vehicle, a frame for supporting the vehicle, a pair of wheels, an axle therefor, journal means for connecting the wheel axle to the frame, torsion spring means mounted on the frame, connections supporting the frame from the journal means through said torsion spring means, damping means acting between said journal means and said frame, and means for adjusting said damping means, said means also serving to hold said torsion spring means in place.

2. In a vehicle or the like, a frame, wheels journaled to the frame, torsional springing means for supporting the frame from the wheel assembly, a crank means rigid with each torsional member and bearing at its extremity on a journal of the wheel assembly to transfer the vehicle load to the wheel assembly, splines holding the torsion member and crank member in rigid adjusted relationship, a member on the frame for supporting the torsion member rigidly at a point distant from the crank connecting splines, and splines holding the torsion member in rigid adjusted relationship relative to the frame, the splines connecting to the frame being of a number unlike the number of splines holding the end of the torsion member to the crank member in order to permit a fine angular differential adjustment between the frame and the crank member.

3. In a railway vehicle or the like, a supporting frame, axle means to support the frame, journal means supporting the frame from the axle, a hollow torsional spring member having a lever member extending at an angle to the axis of said spring member and connected at its extremity to said journal means, a torsional spring means disposed within the hollow spring member and secured thereto in a manner to receive torsional stress from the hollow member, and means fastening one extremity only of the inner member to the frame to resist torsional stresses.

4. In a railway vehicle or the like, a supporting frame, axle means to support the frame, journal means supporting the frame from the axle, a hollow torsional spring member, a lever member extending at an angle to the axis of the spring member from a point adjacent the center of the hollow member to connect at its extremity to said journal means, a bearing in the frame for the hollow member, a torsional spring means disposed within the hollow spring member and secured thereto adjacent its extremity in a manner to receive torsional stress from the hollow member, and means fastening the extremity of the inner member to the frame to resist torsional stresses.

5. In a railway vehicle or the like, a supporting frame, axle means to support the frame, journal means supporting the frame from the axle, a hollow torsional spring member, a lever member extending at an angle to the axis of the spring member to connect at its extremity to said journal means, a bearing in the frame for the hollow member, damping means between the hollow member and the frame, a torsional spring means disposed within the hollow spring member and connected adjacent its extremity to an extremity of the hollow member in a manner to receive torsional stress from the hollow member, and means fastening the other extremity of the inner member to the frame to resist torsional stresses.

6. In a railway vehicle or the like, a supporting frame, axle means to support the frame, journal means supporting the frame from the axle, a hollow torsional spring member having a lever member extending at an angle to the axis of the spring member and connected at its extremity to said journal means, a torsional spring means disposed within the hollow spring member and secured thereto in a manner to receive torsional stress from the hollow member, means fastening one extremity only of the inner member to the frame to resist torsional stresses, and a link connection between the outer end of the lever arm and the journal means.

7. In a railway vehicle or the like, a supporting frame, axle means to support the frame, journal means supporting the frame from the axle, a longitudinally extending member journaled to the frame and having a lever member extending at an angle to the axis of said longitudinal member and connected at its extremity to said journal means, concentric spring means acting to apply torsion to said longitudinal member, and means for guiding said journal means for movement in a substantially vertical plane.

8. In a vehicle having a frame, an axle, and a wheel mounted on said axle, in combination, means transverse to said frame for journalling said axle, a pair of lateral extensions on said frame extending on opposite sides of said axle, torsion spring means attached at one end to one of said extensions and journalled at its other end in the other of said extensions, and means for attaching said journalled end of said torsion spring means to said axle journalling means.

9. The combination according to claim 8 in which said last means includes a lever arm between said torsion spring means and said axle journalling means.

10. In a vehicle having a frame, an axle, and a wheel mounted on said axle, in combination, means for journalling said axle, torsion spring means outside of said frame and having one end attached to an extension of said frame and its other end attached to said axle journalling means, a lever arm bearing upon said axle journalling means and a second torsion spring means connecting said first torsion spring means to said lever arm.

11. The combination according to claim 10 in which said first and second torsion spring means are concentric.

12. In a vehicle having a frame, an axle, and a wheel mounted on said axle, in combination, means for journaling said axle, torsion spring means outside of said frame and having one end attached to an extension of said frame and its other end attached to said axle journaling means, including dampening means connecting said torsion spring means to said frame, and means for adjusting said dampening means, said adjusting means also serving to hold said torsion spring means in place.

13. The combination according to claim 1 in which said torsion spring means is mounted on the frame parallel to said wheel axle.

14. The combination according to claim 1 in which said torsion spring means is mounted on the frame at an angle to the wheel axle.

15. In a vehicle having a frame, an axle, and a wheel mounted on said axle, in combination, means transverse to said frame for journalling said axle, torsion spring means outside of said frame and having one end attached to an extension of said frame and its other end attached to said axle, and dampening means connecting said torsion spring means to said frame.

16. In a vehicle having a frame, an axle, and wheels mounted near each end of said axle, in combination, means for journalling said axle, a lever arm engaging said journalling means and itself journalled in said frame, torsion spring means attached at one end to said frame and at its other end to said lever arm, dampening means inserted between the journalled part of said lever arm and said frame, and complementary means on said torsion spring means and lever arm for permitting adjustment of the springing effect of said torsion spring means upon said axle.

KARL RABE.